Figure 1:
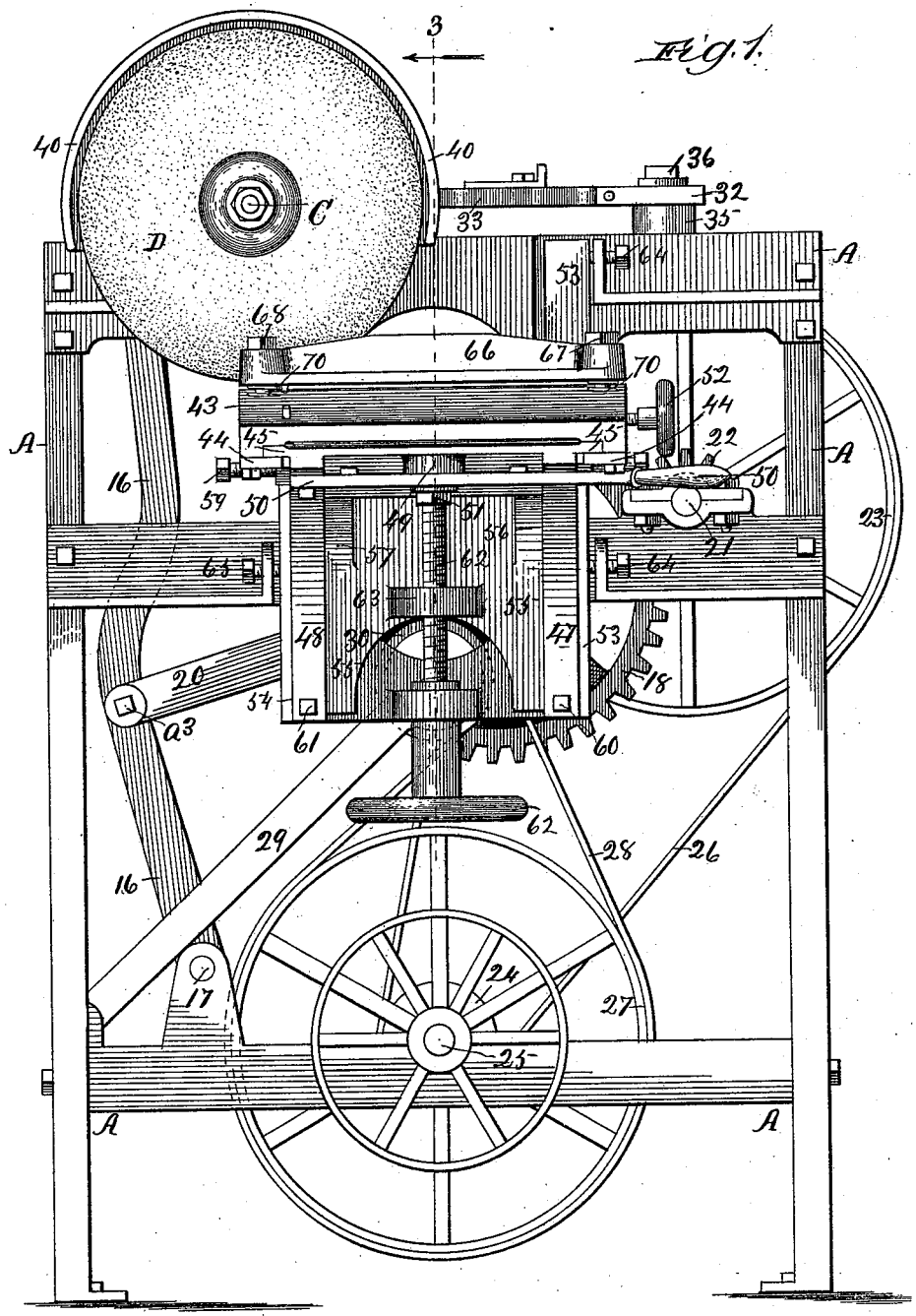

(No Model.) 4 Sheets—Sheet 1.

M. COVEL.
SAW DRESSING MACHINE.

No. 523,882. Patented July 31, 1894.

Witnesses:
Chas. Gaylord,
Clifford White.

Inventor:
Milo Covel,
By L. B. Coupland & Co.
Att'ys

THE NORRIS PETERS CO., PHOTO-LITHO., WASHINGTON, D. C.

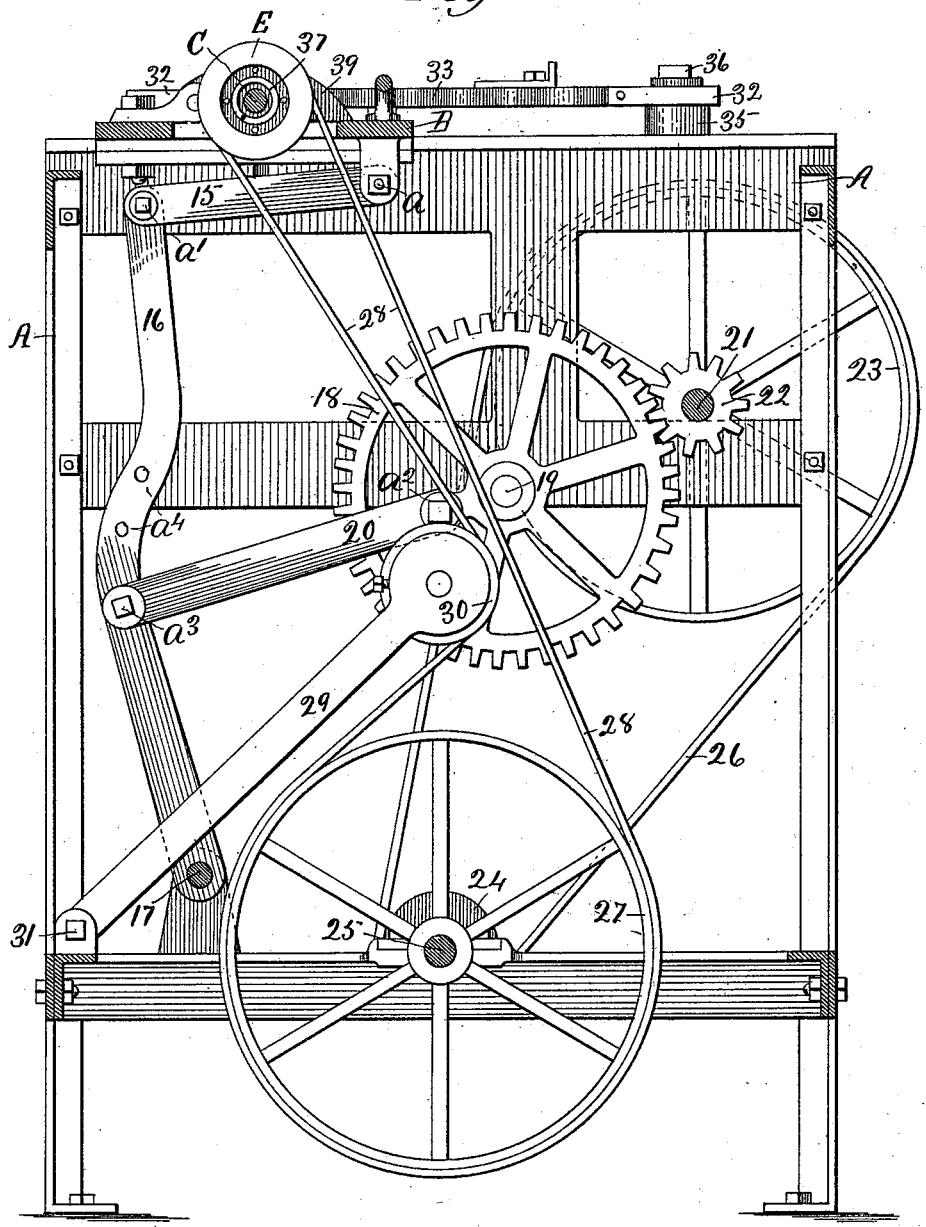

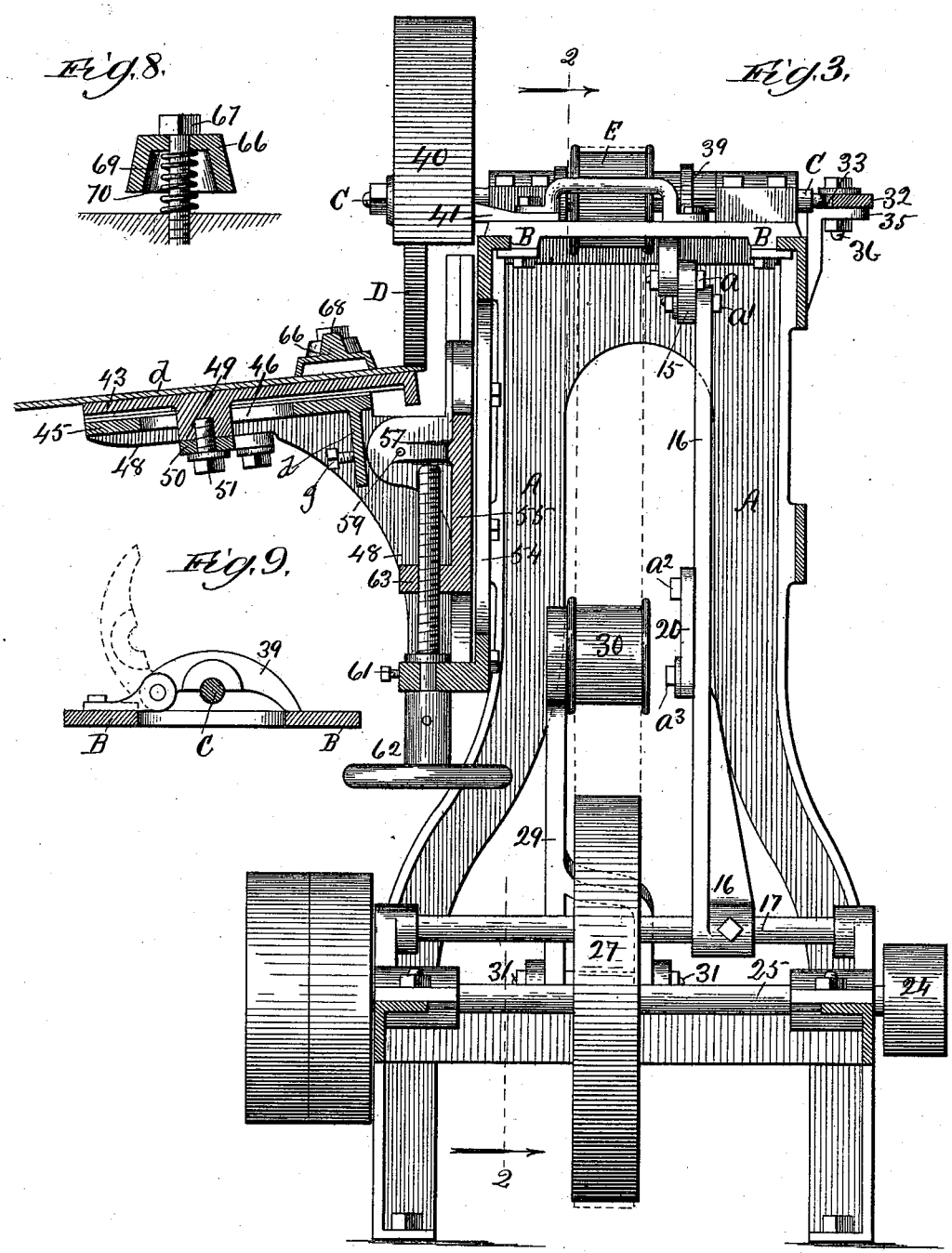

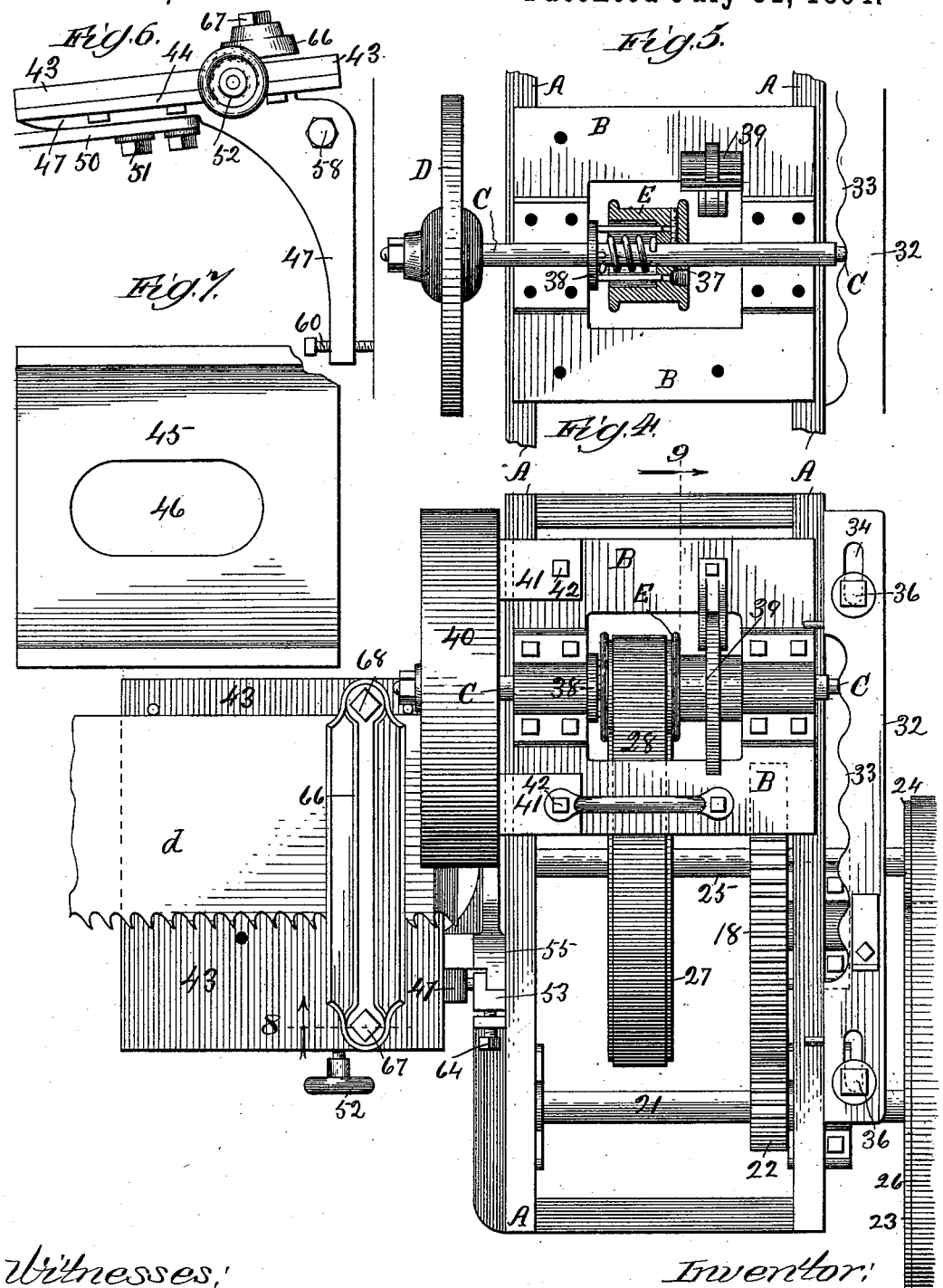

ent offices.

UNITED STATES PATENT OFFICE.

MILO COVEL, OF CHICAGO, ILLINOIS.

SAW-DRESSING MACHINE.

SPECIFICATION forming part of Letters Patent No. 523,882, dated July 31, 1894.

Application filed December 31, 1891. Serial No. 416,677. (No model.)

*To all whom it may concern:*

Be it known that I, MILO COVEL, a citizen of the United States, residing at Chicago, in the county of Cook and State of Illinois, have invented certain new and useful Improvements in Saw-Dressing Machines, of which the following is a full, clear, and exact description, that will enable others to make and use the same, reference being had to the accompanying drawings, forming a part of this specification, in which—

Figure 1 is a front elevation of a machine embodying my improved features; Fig. 2, a vertical longitudinal section on line 2, Fig. 3, looking in the direction indicated by the arrow; Fig. 3, a vertical transverse section (at right angles to Fig. 2) on line 3, Fig. 1, showing an end of a band or straight saw in position to have the end beveled; Fig. 4 a plan showing the end of a band or straight-saw in position to be operated upon; Fig. 5 a broken-away part plan and part section; Fig. 6 a detached side-elevation of the adjustable saw or work-table, showing one of the angle-brackets supporting the same; Fig. 7 a plan of a stationary bed interposed between the under side of the saw-supporting table and the angle-brackets; Fig. 8, a broken-away sectional detail on line 8, Fig. 4; Fig. 9, a broken-away sectional detail on line 9, Fig. 4.

The object of this invention is to provide a machine for dressing or beveling off the joining ends of band-saws preparatory to brazing the same together, as will be hereinafter set forth.

Referring to the drawings, A represents the different parts of the main frame, B the traveling carriage, loosely seated on top of the main frame and adapted to have a reciprocating movement lengthwise thereof, C a transverse shaft, journaled in said carriage, D a grinding or emery-wheel mounted on the front end of shaft C, and E a band-pulley, mounted on said shaft near its longitudinal center.

To the under side of the carriage B is pivoted, as at $a$, one end of link 15, (Figs. 2 and 3.) The opposite end of this link is pivoted, as at $a'$, to the upper end of reciprocating lever 16, the lower end of which is mounted on rock-shaft 17 (see also Fig. 1.) journaled in the lower part of the frame.

A combined crank and gear-wheel 18 is mounted on stub-shaft 19, journaled in the frame. To one of the arms of this gear-wheel is pivoted, as at $a^2$, one end of connecting-rod 20; the opposite end being pivoted, as at $a^3$, to lever 16. By this arrangement the required reciprocating movement is imparted to carriage B.

A number of apertures $a^4$, in the curved part of lever 16, provide for the shifting of the end of connecting-rod 20 to change the throw of said lever and thereby limit the movement of carriage B, as the work may require.

Transverse countershaft 21 is journaled in the frame below the top part and has pinion 22 mounted thereon and which engages with gear-wheel 18, having dual functions as set forth.

Band-pulley 23 is mounted on the rear end of shaft 21, and connects with pulley 24, mounted on driving-shaft 25 journaled in the lower part of the frame, by means of belt 26; by this means transmitting the required rotary action to the combined crank and gear-wheel.

Pulley 27 is mounted on the driving-shaft near its longitudinal center and connects with pulley E, on shaft C, by means of belt 28, and transmits motion to said shaft C carrying the grinding-wheel.

As shaft C and pulley E, mounted thereon, move with carriage B, some means must be employed to keep belt 28 "taut." This requirement is effected by a lever, 29, having a roller, 30, journaled in the inner end and bearing against said belt. The outer bifurcated end of this lever is mounted on pivot-bolt 31 journaled in the frame.

Shaft C, on which the grinding-wheel is mounted, is adapted to have a reciprocating endwise action as well as a rotary movement.

At the rear side of the machine, and just above the frame and in line with shaft C, is located a bar, 32, having the inner corrugated edge 33. This bar is provided in each end with elongated slots, 34 and is supported on two brackets, 35, bolted to and projecting above the top of the frame. This bar has an endwise adjustment by means of clamping-bolts, 36, inserted through the slotted parts into the supporting-brackets. This feature provides for a proper endwise adjustment of the bar with reference to the mechanism governing the movement of the carriage and the character of the work to be done.

When the nature of the work requires it, the rear end of the shaft C is held in contact with the corrugated edge of bar 32 by means of spiral spring 37 (Fig. 5.) chambered in pulley E; the outer end bearing against collar 38. By this means an endwise movement of shaft C is provided for, so that the contacting end will follow and conform to the corrugated edge. This causes the grinding-wheel to follow across the saw in a wavering path and not always in straight or parallel lines, thus producing an uneven surface and keeping a true surface on the face of the grinding-wheel.

When the work does not require the endwise movement of the grinding-wheel shaft, it may be locked against such movement by turning down stop 39 (Fig. 9) which fits over said shaft between the driving-pulley and the journal bearing on that side, as shown in Figs. 2, 3, 4. The disengaged position of stop 39 is illustrated in Fig. 5, and indicated by dotted lines in Fig. 9.

The grinding-wheel dust-guard, 40, is secured to the traveling-carriage by brackets 41, and may be used when the work is under the wheel, (Fig. 3).

An adjustable table 43, for supporting the work and located at the front side of the machine will next be described. This table is provided on the under side at each end with guide-cleats 44, for the loose engagement of the corresponding ends of bed-plate 45, (Figs. 1, 3, 6 and 7) upon which the work-table rests. This bed-plate is provided with the enlarged opening 46, (Fig. 7) and is rigidly fastened to the horizontal part of companion angle-brackets 47 and 48. This bed-plate is also provided along its inner end with the right-angled, downwardly projecting part $d$, (Fig. 3) having a set-screw $g$ inserted therethrough near the respective ends thereof. The part $d$ and set-screw $g$, bear against lugs 56 and 57 and serve the purpose of taking up lost motion, and holding the bed-plate firmly in place.

A cylindrical boss 49, formed on the under side of the work-table projects down through opening 46 in bed-plate 45, and has hand-lever 50 secured thereto by bolt 51. The fulcrum-end of this lever is pivoted to angle-bracket 48. By means of this lever and its connections just described, the table may be moved on its bed, either away from or toward the machine and locked in the position to which it may be set by hand-screw 52.

Guides 53 and 54 are rigidly secured to the frame in a vertical position and receive the bearing-edges of the vertically moving slide 55. This slide is provided on its front side with lugs 56 and 57, to which are attached brackets 47 and 48 by means of pivot-bolts 58 and 59 inserted through the corners of said brackets and which permit the same to be adjusted on their pivot-bolts so that the work-table may be given any required degree of inclination, either above or below a horizontal plane.

Gage-screws 60 and 61 are inserted through the lower ends of the companion brackets 47 and 48 and bear against the front sides of guides 53 and 54, as shown in Figs. 1, 3 and 6. By turning these screws so as to lengthen or shorten the ends projecting through the brackets (Fig. 7) the work-table may be held at any angle to which it is set.

Slide 55 is moved up or down, to raise or lower the work-table, by means of a hand-screw 62 having a threaded engagement with lug 63 formed on said slide. This slide is maintained in a true position by means of set-screws 64 and 65. By these arrangements the work-table may be accurately adjusted and properly supported in any position that the nature of the work and the particular bevel to be given to the surface of the saw may require.

Band or straight saws $d$ are clamped in position to be operated upon by cross-bar 66, which is adjustably secured to the work-table by screw-bolts 67 and 68. This cross-bar is enlarged at its respective ends, and has a chamber 69 (Fig. 8.) opening in from the under side. Seated in these chambered ends, and coiled around bolts 67 and 68, is a spiral spring 70. These springs serve to automatically raise and support the cross-bar out of a clamping position when the clamping-bolts are relaxed, so that the saw may be conveniently inserted or removed.

Having thus described my invention, what I claim as new, and desire to secure by Letters Patent, is—

1. In a saw-dressing machine, the combination with a traveling carriage, of link 15, reciprocating-lever 16, rock-shaft 17, combined crank and gear-wheel 18, mounted on a shaft journaled in the frame, and connecting-rod 20, whereby a reciprocating movement is transmitted to said carriage, substantially as set forth.

2. In a saw-dressing machine, the combination with a traveling carriage, of a grinding-wheel shaft, journaled therein, a bar, having a corrugated edge, and adjustably mounted on the rear side of the machine, and a spring, mounted on said shaft and holding the end thereof against the corrugated bar whereby a reciprocating endwise movement is imparted to the grinding-wheel shaft as the carriage moves forward and back, substantially as set forth.

3. In a saw-dressing machine, the combination with a grinding-wheel shaft, having both a rotary and an endwise movement, of a stop, pivoted at one end and loose at the other and adapted to engage with and lock said shaft against an endwise movement only, substantially as set forth.

4. In a saw-dressing-machine, the combination with a traveling-carriage, having a reciprocating but not a lateral movement, of a grinding-wheel shaft, journaled therein and adapted to have both a rotary and an endwise movement, a bar, provided with a corrugated edge as described, and adjustably mounted on the machine-frame, a spring, mounted on said shaft and holding one end thereof against said corrugated bar when the reciprocating endwise action is required, and a stop, pivoted at one end and loose at the other, the lower end being adapted to engage with and lock said shaft against its endwise movement only, substantially as set forth.

5. In a saw-dressing machine, the combination with a grinding-wheel shaft, having both a rotary and an endwise movement, of a corrugated bar, adjustably secured to the machine-frame, a spring, mounted on said shaft and holding one end thereof against said bar and imparting a reciprocating endwise movement thereof, and a stop, adapted to engage with and lock said shaft against the action of said spring, substantially as set forth.

6. In a saw-dressing machine, the combination of the work-table, provided on the under side at the ends with rabbeted cleats, the bed-plate, having a central opening through which a boss projects from the table, and the hand-lever, pivoted to said boss, whereby said table may be moved toward or away from the machine on its bed, substantially as set forth.

7. In a saw-dressing machine, the combination with the work-table, of a clamping-bar, chambered in its respective ends, fastening-bolts, inserted down through the chambered part, and the spiral-springs, coiled on said bolts, substantially as set forth.

MILO COVEL.

Witnesses:
L. M. FREEMAN,
L. B. COUPLAND.